(12) United States Patent
Ratnam et al.

(10) Patent No.: US 12,538,226 B2
(45) Date of Patent: Jan. 27, 2026

(54) METHOD AND APPARATUS FOR ENABLING GROUP-ADDRESSED FRAME RECEPTION AT CONSTRAINED NON-AP MLDS

(71) Applicant: Samsung Electronics Co., Ltd., Suwon-si (KR)

(72) Inventors: Vishnu Vardhan Ratnam, Plano, TX (US); Boon Loong Ng, Plano, TX (US); Ahmed Atef Ibrahim Ibrahim, Plano, TX (US); Peshal Nayak, Plano, TX (US); Rubayet Shafin, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 584 days.

(21) Appl. No.: 18/045,785

(22) Filed: Oct. 11, 2022

(65) Prior Publication Data

US 2023/0126846 A1    Apr. 27, 2023

Related U.S. Application Data

(60) Provisional application No. 63/393,472, filed on Jul. 29, 2022, provisional application No. 63/390,897, (Continued)

(51) Int. Cl.
*H04W 76/15*  (2018.01)
*H04W 52/02*  (2009.01)

(52) U.S. Cl.
CPC ....... *H04W 52/0219* (2013.01); *H04W 76/15* (2018.02)

(58) Field of Classification Search
CPC . H04W 52/0219; H04W 76/15; H04W 68/02; H04W 52/0216; H04W 84/12; Y02D 30/70
See application file for complete search history.

(56) References Cited

U.S. PATENT DOCUMENTS

2019/0082373 A1*  3/2019  Patil ..................... H04L 1/1614
2021/0250963 A1*  8/2021  Seok ....................... H04W 4/06
(Continued)

FOREIGN PATENT DOCUMENTS

KR    10-2021-0031386 A    3/2021
KR    10-2021-0083232 A    7/2021

OTHER PUBLICATIONS

Asterjadhi ,"Proposed Resolutions to CIDs specified in 11-21/218r0", doc.: IEEE 802.11-21/0915r0, Jul. 2021. (Year: 2021).*
(Continued)

*Primary Examiner* — Ayaz R Sheikh
*Assistant Examiner* — David Zhijun Sun

(57) ABSTRACT

Methods and apparatuses for facilitating the reception of group-addressed frames by multi-link devices (MLDs). A non-access point (AP) MLD comprises STAs, each comprising a transceiver configured to form a link with a corresponding AP of an AP MLD, and a processor. Each link has an associated predetermined time at which a group-addressed frame is expected to be received on the link, and a subset of the links are constrained links configured to operate in a constrained mode of operation. The processor is configured to, while the constrained links are operating in an active listening state in the constrained mode, determine to listen for the group-addressed frame on a first of the constrained links at the associated predetermined time, and after reception of the group-addressed frame on the first constrained link, return to listening on all of the constrained links in the constrained mode.

20 Claims, 12 Drawing Sheets

1605 — DETERMINE TO LISTEN FOR THE AT LEAST ONE GROUP-ADDRESSED FRAME ON A FIRST OF THE CONSTRAINED LINKS AT THE ASSOCIATED PREDETERMINED TIME

1610 — AFTER RECEPTION OF THE AT LEAST ONE GROUP-ADDRESSED FRAME ON THE FIRST CONSTRAINED LINK, RETURN TO LISTENING ON ALL OF THE CONSTRAINED LINKS IN THE CONSTRAINED MODE

Related U.S. Application Data filed on Jul. 20, 2022, provisional application No. 63/309,239, filed on Feb. 11, 2022, provisional application No. 63/303,316, filed on Jan. 26, 2022, provisional application No. 63/271,995, filed on Oct. 26, 2021.

(56) References Cited

U.S. PATENT DOCUMENTS

| | | |
|---|---|---|
| 2021/0297184 A1 | 9/2021 | Huang et al. |
| 2021/0314292 A1 | 10/2021 | Seok et al. |

OTHER PUBLICATIONS

International Search Report and Written Opinion issued Jan. 26, 2023 regarding International Application No. PCT/KR2022/015784, 9 pages.

Kwon, "Proposed Draft Text MAC MLO EMLMR TBDs", doc.: IEEE 802.11-21/0335r12, May 2021, 7 pages.

Extended European Search Report issued Aug. 28, 2024 regarding Application No. 22887452.5, 10 pages.

Asterjadhi, "Proposed Resolutions to CIDs specified in 11-21/218r0", doc.: IEEE 802.11-21/0915r0, Jul. 2021, 52 pages.

IEEE Std 802.11-2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pgs.

IEEE P802.11be/D1.2; Draft Standard for Information technology—Telecommunications and information exchange between systems Local and metropolitan area networks—Specific requirements; "Part 11: Wireless LAN Medium Access Control (MAC) and Physical Layer (PHY) Specifications, Amendment 8: Enhancements for extremely high throughput (EHT)"; Sep. 2021; 735 pages.

IEEE Std 802.11-2016, IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications", Dec. 7, 2016, 3534 pages.

\* cited by examiner

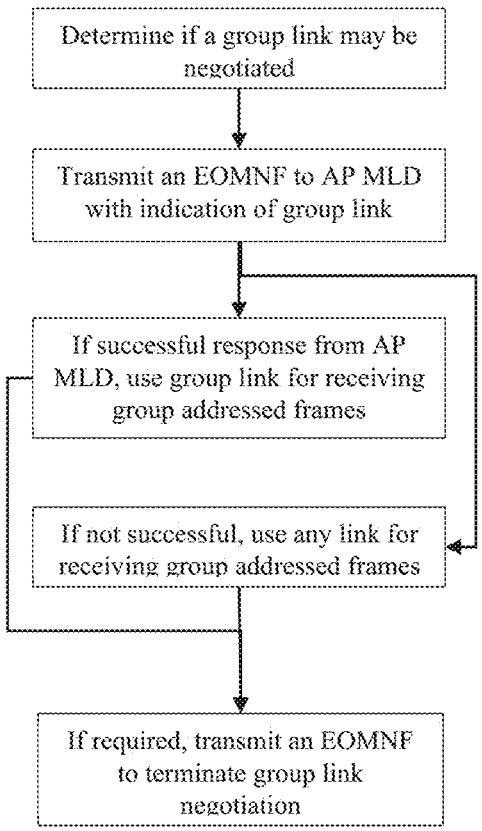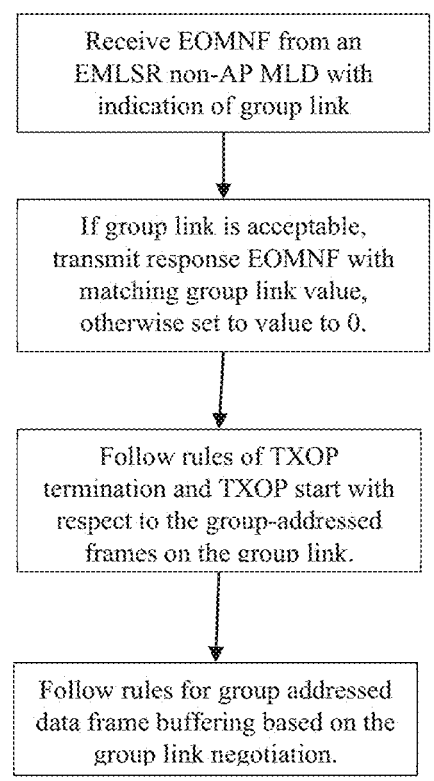
EMLSR non-AP MLD operation
AP MLD operation
FIG. 10A
FIG. 10B

| EMLSR mode | EMLMR Mode | EMLSR Link Bitmap | Primary link present | Primary Link | Reserved | EMLMR Link Bitmap | MCS Map Count | EMLMR Supported MCS and NSS Set |
|---|---|---|---|---|---|---|---|---|
| 1 | 1 | 0 or 16 | 1 | 0 or 4 | 5 or 1 | 0 or 16 | 0 or 2 | variable |

Bits:

FIG. 11

| Order | Information |
|---|---|
| 1 | Category |
| 2 | Protected EHT Action |
| 3 | Default Group Link (see 9.4.1.75 (Default Group Link field)) |

| Value | Meaning | Time priority |
|---|---|---|
| 6 | EML Operating Mode Notification | No |
| 7 | Default Group Link Notification | No |
| 8-255 | | |

METHOD AND APPARATUS FOR ENABLING GROUP-ADDRESSED FRAME RECEPTION AT CONSTRAINED NON-AP MLDS

CROSS-REFERENCE TO RELATED APPLICATION AND CLAIM OF PRIORITY

This application claims priority under 35 U.S.C. § 119(e) to U.S. Provisional Patent Application No. 63/271,995 filed on Oct. 26, 2021, U.S. Provisional Patent Application No. 63/303,316 filed on Jan. 26, 2022, U.S. Provisional Patent Application No. 63/309,239 filed on Feb. 11, 2022, U.S. Provisional Patent Application No. 63/390,897 filed on Jul. 20, 2022, and U.S. Provisional Patent Application No. 63/393,472 filed on Jul. 29, 2022, which are hereby incorporated by reference in their entirety.

TECHNICAL FIELD

This disclosure relates generally to transmission efficiency in wireless communications systems that include multi-link devices. Embodiments of this disclosure relate to methods and apparatuses for facilitating the reception of group-addressed frames by a multi-link device that is operating under constraints on simultaneous transmission and reception across multiple links in a wireless local area network communications system.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Next generation extremely high throughput (EHT) WI-FI systems, e.g., IEEE 802.11be, support multiple bands of operation, called links, over which an access point (AP) and a non-AP device can communicate with each other. Thus both the AP and non-AP device may be capable of communicating on different bands/links, which is referred to as multi-link operation (MLO). The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD. For each link, a non-AP MLD indicates a set of supported maximum number of spatial streams (NSS) and modulation and coding schemes (MCS) in the "EHT-MCS Map" subfield of the "Supported EHT MCS and NSS Set" field of the EHT capabilities element. This is referred to as the link-specific "Basic MCS and NSS".

The component of an MLD that is responsible for transmission and reception on one link is referred to as a station (STA). In several embodiments of non-AP MLDs, transmission on one of the links can cause limitations or impairments on the STAs of the non-AP MLD operating other links. For example, in one class of non-AP MLDs, a pair of links can form a non-simultaneous transmit and receive (NSTR) pair. In an NSTR pair of links, transmission on one link by a STA of the non-AP MLD can cause a very high self-interference at the STA of the non-AP MLD operating on the other link of the NSTR pair. Thus, during a transmission on one link by a non-AP MLD, the STA on the other link may be incapable of sensing the channel occupancy and its network allocation vector (NAV) timer may become outdated, causing a loss of medium synchronization.

The non-AP MLDs in 802.11be can have different capabilities in terms of multi-link operation. Many 802.11be non-AP MLDs may only have a single radio. Enhanced Multi-Link Single Radio (EMLSR) enables a multi-link operation with a single radio. With EMLSR operation, such a non-AP MLD can achieve throughput enhancement with reduced latency—a performance close to concurrent dual radio non-AP MLDs.

EMLSR mode may also be implemented on multi-radio MLDs to improve channel access capability with limited hardware cost and power consumption or to improve spectral efficiency. In EMLSR mode, a multi-radio non-AP device behaves like a single radio device that can perform channel sensing and reception of elementary packets on multiple bands/links simultaneously but can perform reliable data communication on only one link at a time. Thus, by opportunistically selecting a link for data communication where it wins the channel contention, EMLSR can improve system spectral efficiency.

To improve the supported MCS and NSS opportunistically and thus to improve spectral efficiency, IEEE 802.11be also supports an operating mode for a non-AP MLD device called enhanced multi-link multi-radio (EMLMR) mode. Upon the start of a frame exchange sequence with the AP on a first link, a non-AP MLD in EMLMR mode can move radios across from its other links to the first link to improve the supported MCS and NSS on that link. The set of links at an EMLMR non-AP MLD that have this capability to move radios to and from the link are referred to as EMLMR links.

SUMMARY

Embodiments of the present disclosure provide methods and apparatuses for facilitating the reception of group-addressed frames by MLDs operating under constraints on simultaneous transmission and reception across multiple links in a wireless local area network.

In one embodiment, a non-AP MLD is provided, comprising STAs and a processor operably coupled to the STAs. The STAs each comprise a transceiver configured to form a link with a corresponding AP of an AP MLD. Each of the links has an associated predetermined time at which at least one group-addressed frame is expected to be received on the link, and at least a subset of the links are constrained links that are configured to operate in a constrained mode of operation. The processor is configured to, while the constrained links are operating in an active listening state in the constrained mode, determine to listen for the at least one group-addressed frame on a first of the constrained links at the associated predetermined time, and after reception of the at least one group-addressed frame on the first constrained link, return to listening on all of the constrained links in the constrained mode.

In another embodiment, an AP MLD is provided, comprising APs and a processor operably coupled to the APs. The APs each comprise a transceiver configured to form a link with a corresponding station (STA) of a non-AP MLD. Each of the links has an associated predetermined time at which at least one group-addressed frame is expected to be transmitted on the link, and at least a subset of the links are constrained links that are configured to operate in a constrained mode of operation. The processor is configured to determine to initiate a frame exchange on one of the constrained links, determine whether the frame exchange would overlap with the at least one group-addressed frame on any of the constrained links, and based on a determination that the frame exchange would overlap with the at least one group-addressed frame on any of the constrained links, determine that no response to any initial control frame transmitted to the non-AP MLD on any of the constrained links to initiate the frame exchange is expected.

In another embodiment, a method of wireless communication is provided, performed by a non-AP MLD that comprises STAs that each comprise a transceiver configured to form a link with a corresponding AP of an AP MLD, each of the links having an associated predetermined time at which at least one group-addressed frame is expected to be received on the link, and at least a subset of the links being constrained links that are configured to operate in a constrained mode of operation. The method includes the steps of determining, while the constrained links are operating in an active listening state in the constrained mode, to listen for the at least one group-addressed frame on a first of the constrained links at the associated predetermined time, and after reception of the at least one group-addressed frame on the first constrained link, returning to listening on all of the constrained links in the constrained mode.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents and standards descriptions are hereby incorporated into the present disclosure as if fully set forth herein:

[1] IEEE 802.11-2020, "Wireless LAN Medium Access Control (MAC) and Physical Layer (PHY) Specification"

[2] IEEE P802.11be/D1.2

[3] U.S. Patent Application Ser. No. 17/815,937, filed Jul. 28, 2022.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A and 10B illustrate an example procedure for negotiating a group link for group-addressed frame reception by an EMLSR non-AP MLD operating in EMLSR mode according to embodiments of the present disclosure;

FIG. 11 illustrates an example format of an EML control field of an EOMNF with an optional primary link subfield according to embodiments of the present disclosure;

DETAILED DESCRIPTION

Figure 1:
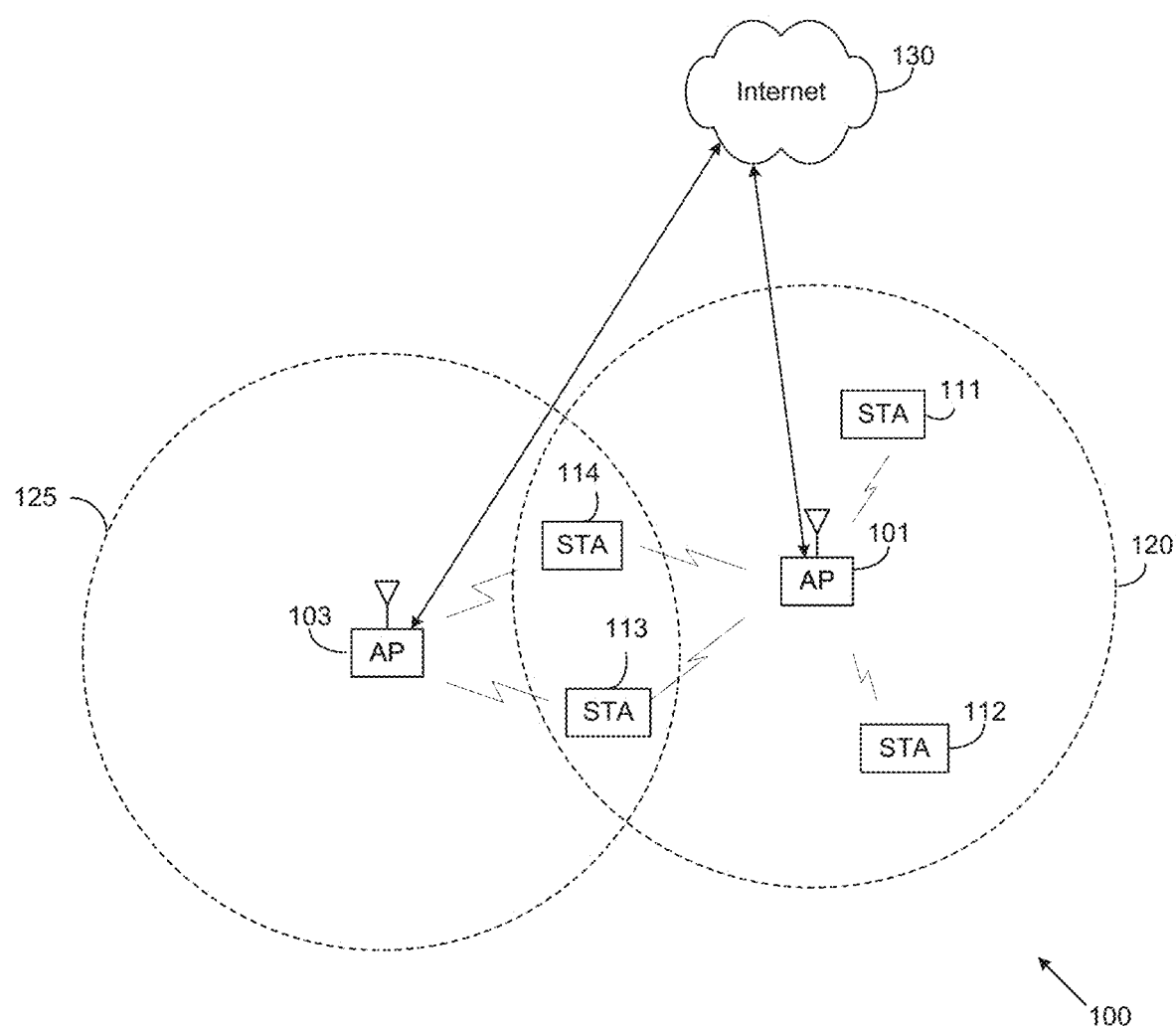
FIG. 1 illustrates an example wireless network according to various embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that when a non-AP MLD operating in EMLSR mode listens on all EMLSR enabled links simultaneously, the device may only decode elementary packets reliably. However, beacon frames and other group-addressed frames may not be included in the list of elementary packets that can be decoded during such a listen operation. Thus, in order to listen for and successfully decode a group-addressed frame on an EMLSR link, a non-AP MLD may need to switch to listening on only that link, with the STAs on other EMLSR enabled links being inactive. If, during this time, the AP MLD initiates a communication (e.g., a frame exchange) with the non-AP MLD on any of the other EMLSR enabled links by sending an initial control frame, a packet reception failure can occur.

Embodiments of the present disclosure further recognize that if an AP MLD wins a transmit opportunity (TXOP) on one link and initiates a frame exchange sequence with the non-AP MLD on that link, the STAs on other EMLSR enabled links of the non-AP MLD are in the inactive state. Thus if the frame exchange sequence on one link overlaps with the target beacon transmission time (TBTT) of another EMLSR enabled link, the non-AP MLD may not be able to decode the beacon frame on the other link. This may cause a violation of a listen interval negotiation between the AP MLD and non-AP MLD.

Accordingly, embodiments of the present disclosure provide methods and apparatuses to improve EMLSR operation such that group-addressed frames of interest can be successfully decoded at an EMLSR non-AP MLD during EMLSR operation.

Embodiments of the present disclosure further recognize that the above discussion can also be extended to an NSTR non-AP MLD and a non-AP MLD operating in EMLMR mode. During a frame exchange sequence on one link that is part of an NSTR link pair, the other link that is part of the same NSTR link pair cannot receive group-addressed frames unless there is start or end time synchronization. During a frame exchange sequence on one EMLMR link, the other EMLMR links may be in the doze state, and cannot receive group-addressed management and data frames reliably.

Accordingly, all non-AP MLDs that face constraints on simultaneous transmission and reception across multiple links (e.g., EMLSR, EMLMR, and NSTR non-AP MLDs) can be referred to as constrained non-AP MLDs, and the embodiments of the present disclosure may apply to all constrained non-AP MLDs to ensure that successful decoding of the group-addressed frames is possible while operating in a constrained mode of operation.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating recovery from loss of medium synchronization for MLDs and renegotiating TID-to-link mapping for EMLSR operation for MLDs in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
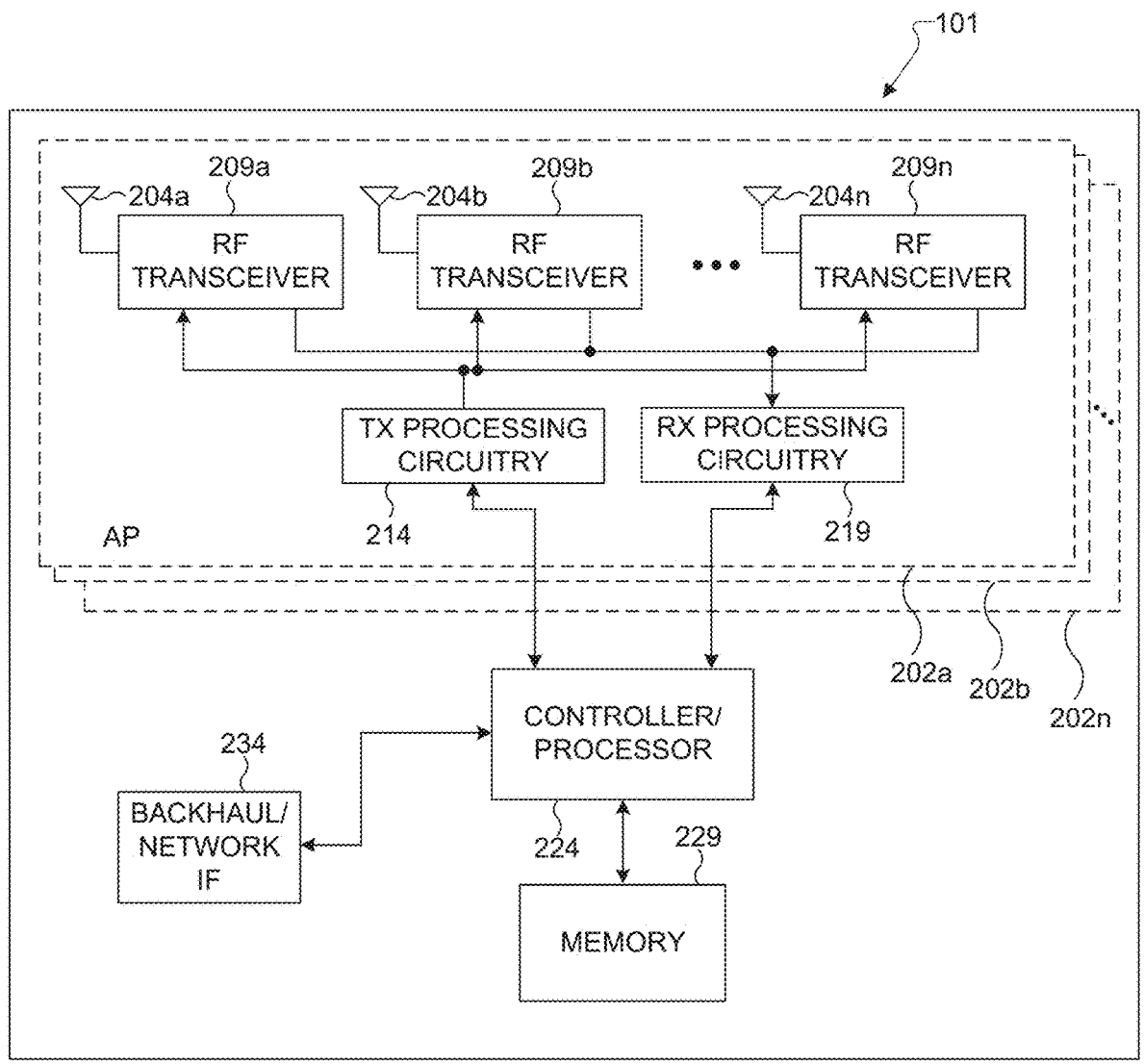
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating recovery from loss of medium synchronization for MLDs and renegotiating TID-to-link mapping for EMLSR operation for MLDs in WLANs. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating recovery from loss of medium synchronization for MLDs and renegotiating TID-to-link mapping for EMLSR operation for MLDs in WLANs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
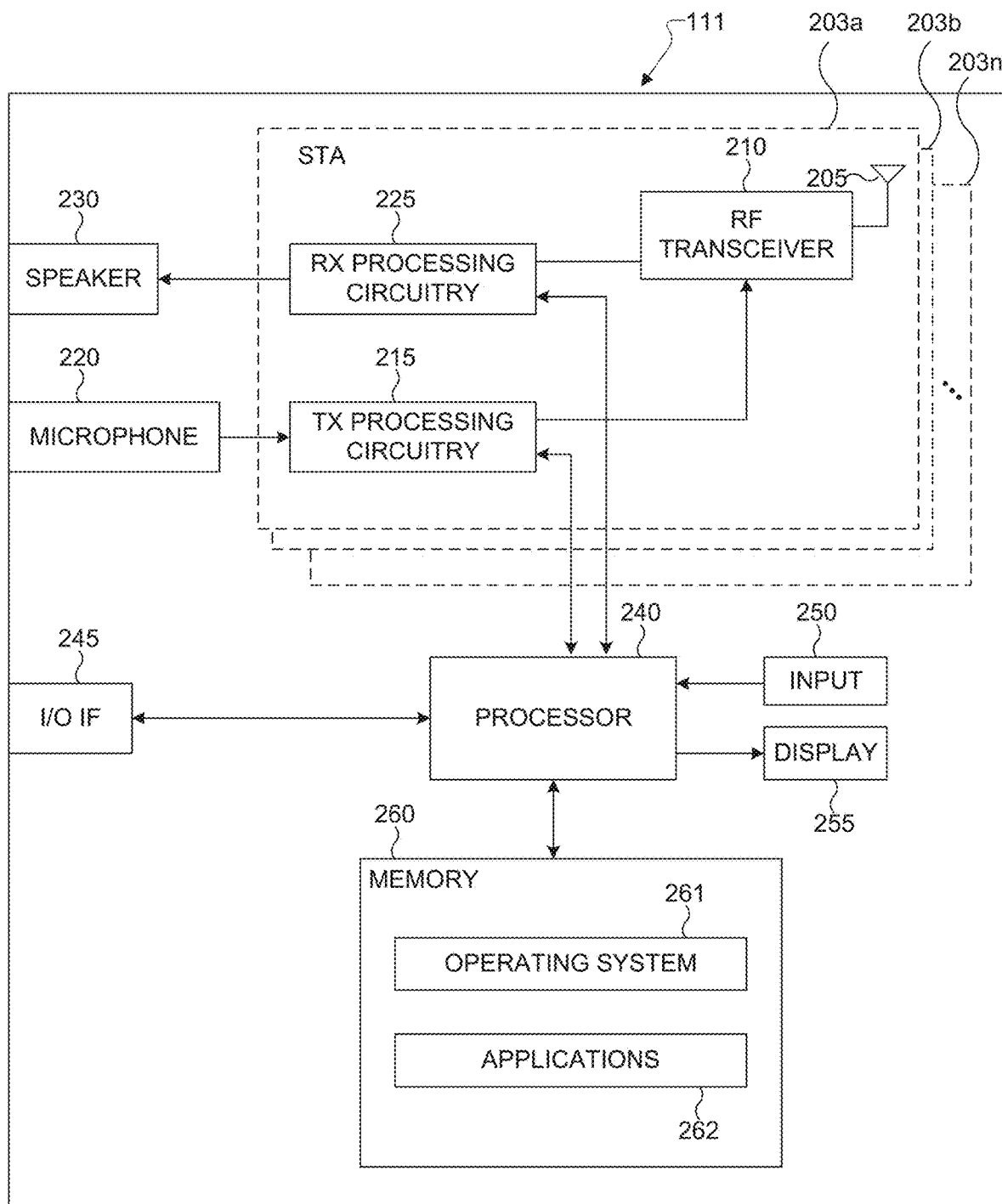
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate recovery from loss of medium synchronization for MLDs and renegotiating TID-to-link mapping for EMLSR operation for MLDs in WLANs. In some embodiments, the controller/processor 240 includes at least one microprocessor or microcontroller.

The controller/processor 240 is also capable of executing other processes and programs resident in the memory 260, such as operations for facilitating recovery from loss of medium synchronization for MLDs and renegotiating TID-to-link mapping for EMLSR operation for MLDs in WLANs. The controller/processor 240 can move data into or out of the memory 260 as required by an executing process. In some embodiments, the controller/processor 240 is configured to execute a plurality of applications 262, such as applications for facilitating recovery from loss of medium synchronization for MLDs and renegotiating TID-to-link mapping for EMLSR operation for MLDs in WLANs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

The operating procedure for EMLSR links is defined in the current 802.11be standard draft. According to this procedure, a non-AP MLD and an AP MLD may declare their ability to support EMLSR operation and the corresponding operation parameters in the enhanced multi-link (EML) capabilities subfield of the basic variant multi-link element that is shared with each other during the association process.

Figure 3:
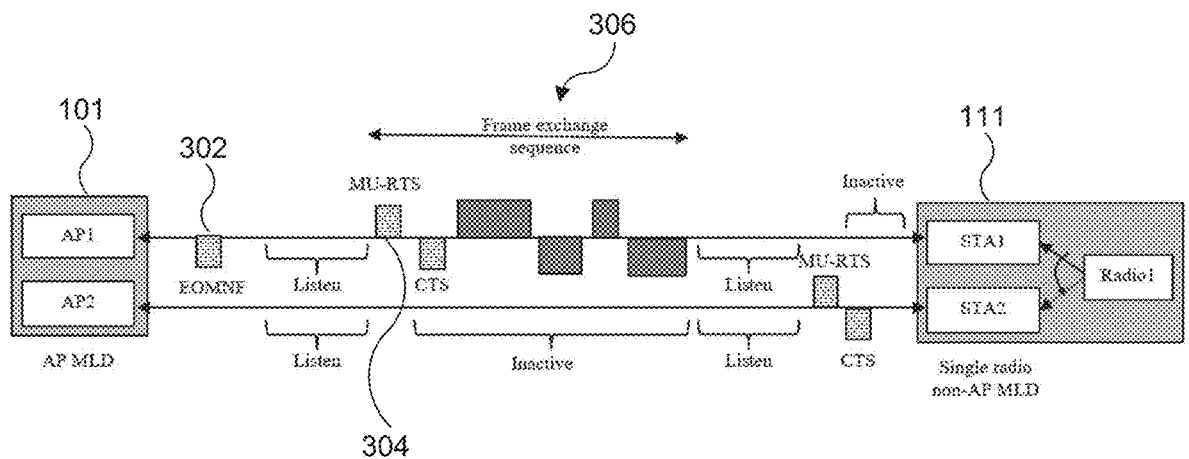
FIG. 3 illustrates an example of EMLSR operation according to embodiments of the present disclosure.

FIG. 3 illustrates an example of EMLSR operation according to embodiments of the present disclosure. In this example, the AP MLD may be an AP MLD 101, and the non-AP MLD may be a non-AP MLD 111. Although the AP MLD 101 is illustrated with two affiliated APs (AP1 and AP2) and the non-AP MLD 111 is illustrated as a single radio non-AP MLD with two affiliated non-AP STAs (STA1 and STA2), it is understood that this process could be applied with suitable MLDs having any number of affiliated APs or STAs. For ease of explanation, it is understood that references to an AP MLD and a non-AP MLD in further embodiments below refer to the AP MLD 101 and non-AP MLD 111, respectively.

If both the AP MLD and non-AP MLD support EMLSR, then in order to initiate EMLSR operation (also referred to as activating EMLSR operating mode), a non-AP MLD first transmits an EML Operating Mode Notification Frame (EOMNF) 302, with the EML control field of the frame set to 1, to any AP affiliated with the AP MLD. The EOMNF 302 may contain several parameters for the EMLSR operation including the identity of the links that shall be considered for the EMLSR mode. Within a fixed delay (indicated in the Transition Timeout subfield of the EML capabilities subfield of the basic variant multi-link element) of transmitting the EOMNF 302, the non-AP MLD shall transition into the EMLSR mode by turning all its STAs associated with EMLSR to active and listen mode. In such a listen mode the EMLSR non-AP MLD is capable of channel sensing and reception of elementary packets.

Upon winning a TXOP on any one of the links associated with the non-AP MLD EMLSR mode, the AP MLD may initiate the frame exchange with the non-AP MLD by transmitting an initial control frame on that link. In the example of FIG. 3, this control frame is a multi-user request-to-send (MU-RTS) frame 304 transmitted on link 1 between STA1 and AP1. After receiving the initial control frame from the AP MLD on a certain link, and after a short delay, the non-AP MLD shall be capable of transmitting and receiving data on that link for the duration of the frame exchange sequence 306. All other EMLSR enabled links of the non-AP MLD (such as link 2 between AP2 and STA2) shall remain inactive for the duration of the frame exchange sequence.

At the end of the frame exchange sequence 306, all the EMLSR enabled STAs of the non-AP MLD shall again switch back to the listen mode to either win a TXOP for uplink transmission or look for another initial control frame from the AP MLD. To exit from an EMLSR operating mode the non-AP MLD shall transmit an EOMNF with the EML control field set to 0 to the AP MLD. After transmission of such an EOMNF from a link, the other links of the non-AP MLD shall transition into power save mode.

The operating procedure for a non-AP MLD in EMLMR mode is defined in the current 802.11be standard draft. According to this procedure, a non-AP MLD and an AP MLD may declare their ability to support EMLMR operation and the corresponding operation parameters in the EML capabilities subfield of the basic variant multi-link element that is shared with each other during the association process.

Figure 4:
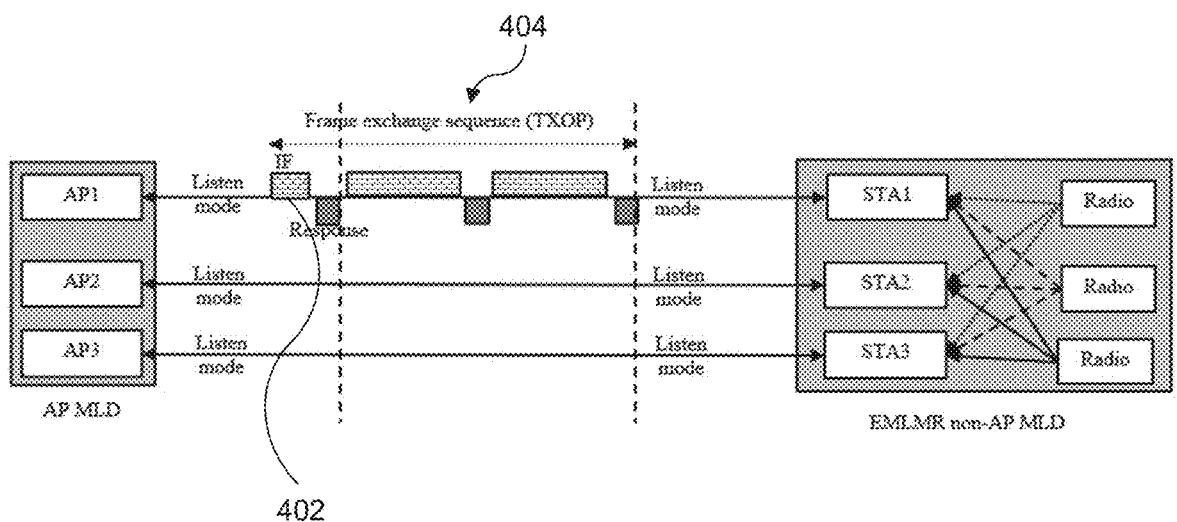
FIG. 4 illustrates an example of EMLMR operation according to embodiments of the present disclosure.

FIG. 4 illustrates an example of EMLMR operation according to embodiments of the present disclosure. In this example, the AP MLD may be an AP MLD 101, and the non-AP MLD may be a non-AP MLD 111. Although the AP MLD 101 is illustrated with three affiliated APs (AP1, AP2, and AP3) and the non-AP MLD 111 is illustrated as a multi-radio non-AP MLD with three affiliated non-AP STAs (STA1, STA2, and STA3) and three radios, it is understood that this process could be applied with suitable MLDs having any number of affiliated APs or STAs, and with differing numbers of radios.

If both the AP MLD and non-AP MLD support EMLMR operation, then in order to initiate EMLMR operation (also referred to as activating EMLMR operating mode), a STA of the non-AP MLD first transmits an EOMNF, with the "EMLMR mode" bit set to 1 in the EML control field of the frame, to the corresponding AP affiliated with the AP MLD. The EOMNF may contain several parameters for the EMLMR operation including the identity of the links that can be considered for the EMLMR mode, via the EMLMR Link bitmap field. In the EML control field of EOMNF, the non-AP MLD also includes an "EMLMR supported MCS and NSS Set" subfield that indicates (via an MCS map), for each channel bandwidth (BW), the maximum supported MCS and NSS combinations in EMLMR mode, which are applicable for all EMLMR links. These values are referred to as "Enhanced MCS and NSS". Within a fixed delay (indicated in the transition timeout subfield of the EML capabilities subfield of the basic variant multi-link element) of transmitting the EOMNF, the non-AP MLD can transition into the EMLMR mode by turning all its STAs associated with EMLMR to active and listen mode. In such a listen mode, the EMLMR non-AP MLD is capable of channel sensing and transmitting and receiving packets on the EMLMR links at the basic MCS and NSS.

Upon winning a TXOP on any one of the EMLMR links associated with the non-AP MLD in EMLMR mode, the AP MLD may initiate the frame exchange with the non-AP MLD by transmitting an initial frame (IF) 402 on that link with sufficient padding. The IF 402 may be, e.g., an MU-RTS frame transmitted on link 1 between STA1 and AP1. After receiving the IF 402 from the AP MLD on a certain link, the non-AP MLD may be capable of transmitting and receiving data on that link for the duration of the frame exchange sequence 404 at the enhanced MCS and NSS declared in the EOMNF. This reception at the enhanced MCS and NSS is accomplished by the EMLMR non-AP MLD switching in radios from other links. The padding in the IF is to provide sufficient time for such switching, and this time is disclosed in the EMLMR delay subfield of the EML capabilities field of the basic variant multi-link element.

At the end of the frame exchange sequence 404, all the EMLMR enabled STAs of the non-AP MLD may again switch back to the listen mode to either win a TXOP for uplink transmission, or look for another initial control frame from the AP MLD. To exit from an EMLMR operating mode, the non-AP MLD may transmit an EOMNF with the EMLMR mode bit of the EML control field set to 0 to the AP MLD.

As noted herein above, it is understood that there are different types of constrained non-AP MLDs that face similar constraints on simultaneous transmission and reception on multiple constrained links. For the sake of simplicity, embodiments of the present disclosure discussed herein below are discussed in the context of EMLSR operation, but it is understood that they may be extended to EMLMR and NSTR operation. Additionally, it is understood that while beacon frames are discussed in the below embodiments of the present disclosure, the embodiments may be applied to any suitable group-addressed frames.

Figure 5:
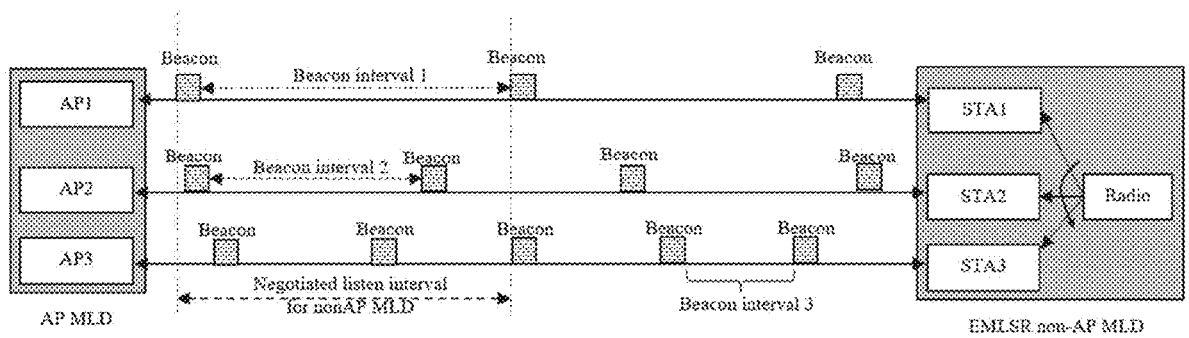
FIG. 5 illustrates an example of a non-AP EMLSR MLD that is associated with an AP MLD on multiple links and beacon transmissions on those links according to embodiments of the present disclosure.

FIG. 5 illustrates an example of a non-AP EMLSR MLD that is associated with an AP MLD on multiple links and beacon transmissions on those links according to embodiments of the present disclosure. In this example the non-AP MLD is operating on L=3 EMLSR links—link 1 between AP1 and STA1, link 2 between AP2 and STA2, and link 3 between AP3 and STA3. It is understood that in other embodiments any number of APs and STAs (with corresponding links) may be present, and that other APs and STAs may be present that form links which are not EMLSR enabled links.

A switch to the EMLSR mode can be made by a non-AP MLD by transmitting an EOMNF to the AP MLD with an indication of the L links to be enabled for EMLSR mode operation. Furthermore, the STAs of the non-AP MLD on the L links may be operating in power save mode to enable the EMLSR operation. The AP MLD may transmit beacon frames periodically on all L links, and the target beacon transmit times (TBTTs) and beacon intervals can be the same or different on the L links. During multi-link association, the non-AP MLD may also have negotiated a listen interval by filling the listen interval field in the association request frame.

If all STAs of the non-AP MLD that are operating on the L EMLSR enabled links are in power save mode, then at least one of the STAs may wake up to receive at least one beacon frame scheduled for transmission within the interval of duration equal to the listen interval indicated by the non-AP MLD, starting from the last TBTT for which another STA or the same STA affiliated with the MLD was awake.

As discussed above, such a decoding of beacon frames on a first EMLSR enabled link may not be possible if another STA that corresponds to a second EMLSR enabled link is engaging in a frame exchange sequence that overlaps with the TBTT on the first link. Furthermore, if the non-AP MLD is listening for a beacon frame transmitted by the AP MLD on a first link during a TBTT, it may be unable to receive an initial control frame transmission by the AP MLD on a second link for the duration of the TBTT on the first link, causing failure of packet transmission.

Additionally, as mentioned in Section 35.3.10.2 of [2], the quiet elements corresponding to overlapping quiet intervals which protect restricted target wake time (rTWT) traffic on a first link are only included in the beacon frames of the first link and not in beacon frames transmitted on other links. Therefore, to ensure sufficient protection to rTWT traffic, during any listen interval a non-AP MLD may wish to decode the beacon frame of a particular EMLSR enabled link if the beacon frame from that link hasn't been decoded by the non-AP MLD in a long time.

Embodiments of the present disclosure discussed herein below provide functionality for the AP MLD to prevent downlink scheduling of frame exchanges to a non-AP MLD on a first link if they will overlap with a TBTT on a second link, if the non-AP MLD intends to decode the beacon frame on the second link. Below embodiments also provide similar protection may for group-addressed frame transmissions (such as beacon frame transmissions) on the second link.

In some embodiments, beacon frames can be included in the list of basic control and management frames that can be decoded by an EMLSR non-AP MLD when it is in listen mode on all the EMLSR enabled links.

In other embodiments, a non-AP MLD operating in EMLSR mode may not be required to decode at least one beacon frame every listen interval. Instead, the EMLSR non-AP MLD may be required to decode a beacon whenever a critical update is made to the basic service set (BSS) parameters of any of its EMLSR enabled links. Such a critical update can be checked by decoding the beacon frame more infrequently, such as every delivery traffic indication map (DTIM) interval.

In a first embodiment, if an EMLSR non-AP MLD desires to decode a beacon or other group-addressed frames on a link, it may unilaterally decide to start listening on that link at the beginning of the corresponding TBTT without notifying the AP MLD. After completion of the beacon reception and any following group-addressed frames to be decoded by the non-AP MLD on that link, the EMLSR non-AP MLD may switch to the listening operation on all links. If the AP MLD wins a TXOP and transmits an initial control frame to the EMLSR non-AP MLD on a link and does not receive a corresponding response frame within a stipulated time (e.g., because the non-AP MLD is listening on a different link and has not notified the AP MLD), it may end the TXOP by transmitting a CFend frame on that link and performing a back-off procedure, or it may transmit eligible data frames to other users within the same TXOP.

In addition, an AP of the AP MLD that successfully obtains a TXOP on a first link for frame exchange with a non-AP MLD that is operating in EMLSR mode may terminate the TXOP before the group-addressed frame transmission on the same or any of the other EMLSR enabled links of the non-AP MLD, if the non-AP MLD is expected to decode those group-addressed frames. Moreover, the AP MLD may terminate the TXOP at least a guard time before the group-addressed frame transmission is expected to begin (e.g., before the TBTT). The guard time may correspond to, for example, an EMLSR transition delay, which is an amount of time that is needed for the EMLSR non-AP MLD to switch a radio between links. This ensures that the non-AP MLD is able to listen for the group-addressed frame at the expected time.

In one variant of the first embodiment, if the AP MLD doesn't receive a response from the EMLSR non-AP MLD for an initial control frame that it transmitted on a link to reserve a TXOP that overlaps with a TBTT on another link, the contention window size may not be incremented by the AP MLD.

In another variant of the first embodiment, if an AP MLD does not receive, within a stipulated time of transmitting an initial control frame on a link, a response for that initial control frame from a STA associated with an EMLSR non-AP MLD, and if the initial control frame initiated the TXOP, then the AP MLD may transmit a CFend frame on that link and may also initiate a back-off procedure for the EMLSR non-AP MLD on all of the EMLSR links. Alternatively, the AP of AP MLD may perform a back-off procedure on one link, and may perform a conditional back-off procedure on other links only if the initial control frame transmission time was overlapping with group-addressed frame transmissions on other links. In one example, the duration of the conditional back-off can be equal to the duration of the group-addressed frame transmission. The stipulated time can be, for example, an interval of aSIFS-Time+aSlotTime+aRxPHYStartDelay that begins when the MAC at the AP receives the PHY-TXEND.confirm primitive for the transmitted initial control frame.

In a second embodiment, before a TBTT of a beacon on an EMLSR enabled link that the non-AP MLD wants to decode, the non-AP MLD may transmit an EOMNF to the AP MLD with the EMLSR Mode field set to 0 to indicate that it is exiting from the EMLSR mode. The EOMNF may be transmitted on the link on which the target beacon to be decoded is to be transmitted, or on any other EMLSR enabled link. Furthermore, the EOMNF can be included in a frame exchange sequence initiated by the AP MLD on any link, or can be transmitted in the uplink by the non-AP MLD after it gains the channel access.

In one variant of the second embodiment, a sufficient guard time, such as the EMLSR padding delay or EMLSR transition delay listed in the EML capabilities subfield of the basic-variant multi-link element transmitted by the non-AP MLD, may be provided between the transmission of the EOMNF and the TBTT corresponding to the beacon to be decoded.

In one variant of the second embodiment, if the non-AP MLD is unable to transmit the EOMNF to indicate the mode switch before the beacon frame, due to channel contention or other reasons, it may unilaterally decide to exit the EMLSR mode to receive the beacon frame without transmission of the EOMNF. Upon completion of reception of the target beacon frame and any following group-addressed data frames of interest, the non-AP MLD may transmit another EOMNF to the AP MLD with the EMLSR mode field set to 1 to indicate that it is transitioning back to EMLSR mode of operation. In one embodiment, for the received EOMNFs from the non-AP MLD, the AP MLD may respond with a response EOMNF, while in another embodiment it may not send a response EOMNF.

In a third embodiment, beacon frames may be included in the list of basic control and management frames that can be decoded by an EMLSR non-AP MLD when it is in the EMLSR listen mode on all of the EMLSR enabled links. An AP MLD that successfully obtains a TXOP on a first link for frame exchange with a non-AP MLD that is operating in EMLSR mode may terminate the TXOP before the TBTT of any of the other EMLSR enabled links of the non-AP MLD. In addition, an AP MLD may not initiate a TXOP and transmit an initial control frame to an EMLSR non-AP MLD if the response frame to the initial control frame is expected to overlap with a TBTT on another EMLSR enabled link. Similarly, a non-AP MLD that is operating in EMLSR mode and that successfully obtains a TXOP on a first link for frame exchange with the AP MLD, may terminate the TXOP before the TBTT of any of the other EMLSR enabled links of the non-AP MLD. In addition, an EMLSR non-AP MLD may not initiate a TXOP to an AP MLD if the start time of the transmission is expected to overlap with a TBTT on another EMLSR enabled link.

In a fourth embodiment, an AP MLD that successfully obtains a TXOP on a first link for frame exchange with a non-AP MLD that is operating in EMLSR mode, may terminate the TXOP before the TBTT of any of the other EMLSR enabled links of the non-AP MLD. Moreover, the AP MLD may terminate the TXOP at least a guard time before the TBTT of any of the other EMLSR enabled links. The guard time may correspond to, for example, an EMLSR transition delay.

In addition, an AP MLD may not initiate a TXOP and transmit an initial control frame to an EMLSR non-AP MLD if the TXOP start time overlaps with the beacon transmission on another EMLSR enabled link. Furthermore, an AP MLD may not initiate a TXOP and transmit an initial control frame to an EMLSR non-AP MLD if the TXOP start time overlaps with the group-addressed frame transmissions on another EMLSR enabled link and the non-AP MLD is expected to decode the group-addressed frames.

In one variant of the fourth embodiment, a sufficient guard time, such as the EMLSR padding delay or EMLSR transition delay listed in the EML capabilities subfield of the basic-variant multi-link element transmitted by the non-AP MLD, may be provided between the termination of the TXOP and the beginning of the corresponding TBTT and between the end of beacon frame or group-addressed frame transmissions and the start of the TXOP (e.g., the transmission of the initial control frame for the TXOP). Similar rules may also be applied to the non-AP MLD for the case when the EMLSR non-AP MLD attempts to win a TXOP for transmission to an AP MLD.

In one variant of this embodiment, the aforementioned rules to avoid beacons may only be applied if the Critical Update flag subfield of the capability information field is set to 1 in the beacons transmitted on any of the EMLSR enabled links (as specified in Section 35.3.9 of [2]). When the critical update flag subfield is set to 0 on all the beacons, such TXOP rules to avoid beacons may not be applied. In another variant, when the Critical Update flag is set to 1, then the aforementioned beacon avoidance rules can be selectively applied only to the links for which the BSS Parameter Change count field was incremented.

In a fifth embodiment, the non-AP MLD may nominate one of the EMLSR enabled links as a group link for receiving beacon frames, referred to as target beacons, when in EMLSR mode. The non-AP MLD intends to decode all group-addressed frames on the group link. The group link may also be referred to as a primary link, default group link, protected link, secure link, common link, default link, or any other suitable name.

In one variant, the nominated group link can be indicated to the AP MLD in the EOMNF transmitted by the non-AP MLD by specifying the corresponding link ID in a new "primary link" subfield within the EML control field transmitted in the EOMNF action frame.

Figure 6:
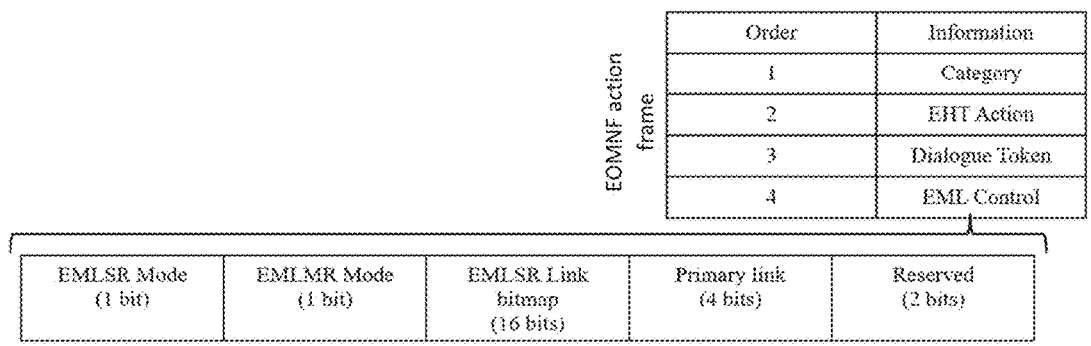
FIG. 6 illustrates an example format of an EOMNF action frame including a primary link subfield according to embodiments of the present disclosure.

FIG. 6 illustrates an example format of an EOMNF action frame including a primary link subfield according to embodiments of the present disclosure. For example, the primary link subfield of FIG. 6 may correspond to the fifth embodiment, and may indicate the link ID of the nominated group link.

In another variant, the link on which the EOMNF is transmitted to activate the EMLSR mode is implicitly understood to be the group link on which the non-AP MLD is expected to decode the beacon frames. In yet another variant, the group link may be the link which has the longest inter-beacon interval among the EMLSR enabled links. If multiple EMLSR enabled links qualify for having the longest inter-beacon interval, the group link may be the link with the smallest link ID value among such links.

An AP MLD that successfully obtains a TXOP on a first link for frame exchange with a non-AP MLD that is operating in EMLSR mode, may terminate the TXOP before the TBTT of a target beacon of the non-AP MLD. In addition, an AP MLD may not initiate a TXOP and transmit an initial control frame to an EMLSR non-AP MLD if the TXOP start time overlaps with either a target beacon frame transmission or the group-addressed frame transmissions on the primary link where the non-AP MLD is expected to decode the group-addressed frames. Similar rules may also be applied to the non-AP MLD for the case in which the EMLSR non-AP MLD attempts to win a TXOP for transmission to an AP MLD.

In one variant of this embodiment, a sufficient guard time, such as the EMLSR padding delay or EMLSR transition delay listed in the EML capabilities subfield of the basic-variant multi-link element transmitted by the non-AP MLD, may be provided between the termination of the TXOP and the beginning of the corresponding TBTT on the primary link and between the end of beacon-frame or group-addressed frame transmissions on the primary link and the start of the TXOP.

In one embodiment, if there is a change to a value carried in the BSS Parameters Change Count subfield of an AP operating on a non-primary link of the AP MLD, then the beacons corresponding to that non-primary link may also temporarily be considered as target beacons. The duration of such inclusion in the list of target beacons can be until the Critical Update flag subfield of the capability information field is set to 1 in the beacons corresponding to the primary link (as specified in Section 35.3.9 of [2]).

In a variant of this embodiment, the EMLSR Primary link subfield can be of length 2 bits, and in conjunction with the EMLSR Link Bitmap subfield may indicate the link ID of the primary link to be used by the non-AP MLD in EMLSR mode for receiving group-addressed frames. A value of i in the EMLSR Primary link subfield indicates that the position of the i-th bit that is set to 1 in the EMLSR Link Bitmap subfield corresponds to the link ID that can be used for receiving group-addressed frames. A value of 0 in the EMLSR Primary link subfield indicates that a primary link has not been negotiated.

In this variant, when a non-AP MLD with dot11EHTEMLSROptionImplemented equal to true intends to negotiate a primary link for group-addressed frame reception, a STA affiliated with the non-AP MLD may transmit an EML Operating Mode Notification frame with the EMLSR primary link subfield of the EML Control field of the frame set to a non-zero value, to an AP affiliated with an AP MLD with dot11EHTEMLSROptionImplemented equal to true.

In one variant, an AP affiliated with the AP MLD may either accept or reject a primary link negotiation with an EMLSR non-AP MLD by setting, in the response EML Operating Mode Notification frame that it transmits, the EMLSR primary link subfield of the EML Control field to either the same value as in the received EML Control field from the non-AP MLD (indicating acceptance) or to zero (indicating rejection).

In another variant, an AP may always accept the primary link negotiation with an EMLSR non-AP MLD by setting, in the response EML Operating Mode Notification frame that it transmits, the EMLSR primary link subfield of the EML Control field to the same value as in the received EML Control field from the non-AP MLD. Upon receiving, in response to a transmitted EML Operating Mode Notification Frame, an EML Operating Mode Notification frame from an AP of the AP MLD on one of the EMLSR links by the STA affiliated with the non-AP MLD with a matching EMLSR primary link subfield in the EML Control field to the transmitted EML Operating Mode Notification Frame, the primary link negotiation may be deemed successful.

In one variant, when negotiating a primary link, both the AP MLD and the EMLSR non-AP MLD may ensure that the non-AP MLD does not have any broadcast TWT agreements with the AP MLD on a non-primary link. When a non-AP MLD with dot11EHTEMLSROptionImplemented equal to true that is operating in EMLSR mode intends to terminate a primary link negotiation for group-addressed frame reception, a STA affiliated with the non-AP MLD may transmit an EML Operating Mode Notification frame with the EMLSR primary link subfield of the EML Control field of the frame set to a zero value to an AP affiliated with the AP MLD with dot11EHTEMLSROptionImplemented equal to true.

An EMLSR non-AP MLD that has negotiated a primary link with the AP MLD by transmitting an EML Operating mode notification frame with the EMLSR Primary Link sub-field of the EML Control field set to a non-zero value may use the STA affiliated with the primary link for receiving the group-addressed frames. When a STA affiliated with an EMLSR non-AP MLD that has negotiated a primary link receives a BSS Parameter Change Count subfield for an AP operating on a non-primary link that is affiliated with an AP MLD with which the non-AP MLD has performed multi-link setup, and the value of the BSS Parameter Change Count subfield for the AP is different from the previously received value, then a STA of the non-AP MLD may transmit a probe request frame to the associated AP soliciting information of the AP as defined in Section 35.3.8 of [2].

To enable reception of group-addressed frames, the AP and non-AP MLD may follow one or more of the following rules:

An AP affiliated with the AP MLD may end frame exchanges initiated with a STA affiliated with the non-AP MLD on one of the EMLSR links at least an EMLSR transition delay, indicated in the EMLSR Transition Delay subfield, before another AP affiliated with the same AP MLD schedules transmission of group-addressed frames on another EMLSR link, if the STA affiliated with the non-AP MLD on the other EMLSR link is expected to receive those group-addressed frames.

An AP affiliated with the AP MLD may not initiate a frame exchange with a STA affiliated with the non-AP MLD on one of the EMLSR links either during or within an EMLSR transition delay of the end of group-addressed frame transmissions by another AP affiliated with the same AP MLD on another EMLSR link, if the STA affiliated with the non-AP MLD on the other EMLSR link is expected to receive those group-addressed frames. The expectation to receive group-addressed frames on a link by a non-AP MLD can be inferred at the AP MLD from, for example, the primary link negotiation procedure or wake TBTT negotiation as defined in 26.8.6 (Negotiation of wake TBTT and wake interval) of [2].

If an AP affiliated with the AP MLD initiates a frame exchange with a STA that is affiliated with the non-AP MLD on one of the EMLSR links, and the frame exchange will overlap in time with the reception of group-addressed frames on another EMLSR link, then the STA affiliated with the non-AP MLD may not respond to the initial Control frame that is transmitted by the AP affiliated with the AP MLD to initiate the frame exchange.

A STA affiliated with the non-AP MLD that initiates a frame exchange in a TXOP on one of the EMLSR links may end the TXOP at least an EMLSR transition delay before the TBTTs of any other EMLSR links if the STA intends to receive the beacon frames that are scheduled to be transmitted in those TBTTs.

In one embodiment, an AP MLD may not buffer group-addressed frames on a link if there are no non-MLD non-AP STAs associated or no non-MLD non-AP STAs operating in power save mode or no associated non-AP MLDs expect to receive the group-addressed frames on that link. An EMLSR non-AP MLD that has negotiated a primary link with the associated AP MLD by transmitting an EML Operating mode notification frame with the EMLSR Primary Link sub-field of the EML Control field set to a non-zero value may use the STA affiliated with the primary link for receiving the group-addressed frames.

In a sixth embodiment, before the TBTT corresponding to a beacon that the non-AP MLD may desire to decode (referred to as the target beacon), the non-AP MLD may transmit an EOMNF to indicate to the AP MLD the target beacon that it wants to decode. In this embodiment, the EML control field of the EOMNF may have a 1-bit 'Temporary action' sub-field that indicates if the mode switch requested in the EOMNF is for a temporary change or a permanent change.

Figure 7:
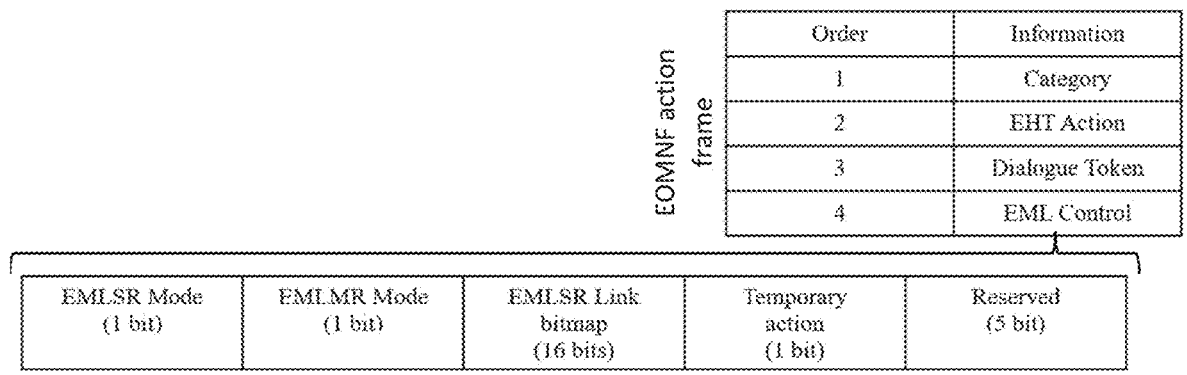
FIG. 7 illustrates an example format of an EOMNF action frame including a Temporary action subfield according to embodiments of the present disclosure.

FIG. 7 illustrates an example format of an EOMNF action frame including a Temporary action subfield according to embodiments of the present disclosure. When a non-AP MLD transmits on a link an EOMNF with the temporary action subfield set to 1, the duration of the requested action can either be a predetermined time value or it can be up to the next closest TBTT on that link. In one example, before the TBTT for a beacon that the non-AP MLD wants to decode, the non-AP MLD may transmit on the same link an EOMNF with EMLSR mode subfield of EML control field set to 0 and the Temporary action subfield of the EML control field set to 1. Upon receiving such an EOMNF, the AP MLD may understand that the next beacon on that link is the target beacon.

In another example, before the TBTT for a beacon that the non-AP MLD wants to decode, the non-AP MLD may transmit on any EMLSR enabled link an EOMNF with EMLSR mode subfield of EML control field set to 0 and the Temporary action subfield of the EML control field set to 1. Upon receiving such an EOMNF, the AP MLD may understand that the next earliest beacon among all of the EMLSR enabled links is the target beacon.

The AP MLD and the EMLSR non-AP MLD may then follow similar rules for winning the TXOP as in the fourth embodiment, if the beacon in consideration is a target beacon. For other beacons, such rules may not be applicable. In one embodiment, if the non-AP MLD is unable to transmit the EOMNF to indicate the target beacon before the target beacon frame's start time, due to channel contention or other reasons, it may unilaterally decide to receive and decode the target beacon frame without transmission of the EOMNF. In one embodiment, for the received EOMNFs from the non-AP MLD, the AP MLD may respond with a response EOMNF while in another embodiment it may not send a response EOMNF.

In a seventh embodiment, an EMLSR non-AP MLD may use an EOMNF to indicate to the AP MLD a duration of time for which the AP MLD should not schedule downlink traffic to the non-AP MLD on any of the EMLSR enabled links. Such a duration can be used for listening to beacon frames, sending probe requests to other AP MLDs, performing channel measurements, performing power save, or any other tasks. This can be accomplished by including a new field 'duration' in the EOMNF action frame to indicate a duration of application of the EOMNF.

Figure 8:
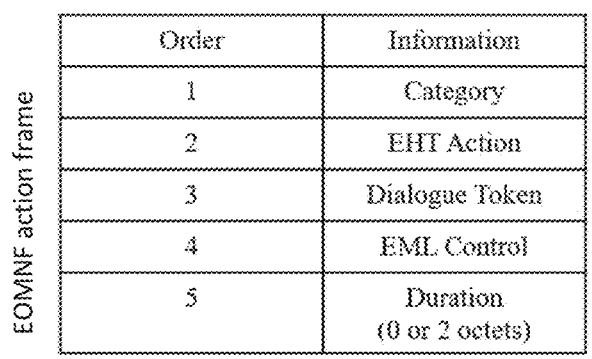
FIG. 8 illustrates an example format of an EOMNF action frame including a Duration field according to embodiments of the present disclosure.

FIG. 8 illustrates an example format of an EOMNF action frame including a Duration field according to embodiments of the present disclosure. This field may be optional and may be in the units of TBTTs or time units (TUs). A duration value of 0 can be used to indicate that the EOMNF request does not have an end time.

In one example, upon receipt of an EOMNF from a non-AP MLD with EMLSR mode subfield set to 0 and a non-zero value in the Duration field, the AP MLD may not schedule a downlink TXOP to the non-AP MLD on any of the EMLSR enabled links until the end of the indicated duration, starting from the time of receipt of the EOMNF. Such an EOMNF can be transmitted before the TBTT of a beacon that the non-AP MLD intends to decode.

In one embodiment, if the non-AP MLD is unable to transmit the EOMNF to the AP MLD before the desired beacon transmit time, due to channel contention or other reasons, it may unilaterally decide to receive and decode the beacon frame without transmission of the EOMNF. In one embodiment, for the received EOMNFs from the non-AP MLD, the AP MLD may respond with a response EOMNF while in another embodiment it may not send a response EOMNF.

In an eighth embodiment, a similar goal to that of the seventh embodiment—stopping downlink traffic for an intended duration—may be achieved by transmitting a service muting notification frame (SMNF) from the non-AP MLD to the AP MLD, as defined in [3]. Thus, before the TBTT of a desired beacon, the EMLSR non-AP MLD may transmit an SMNF to the AP MLD with the SMNF start time and duration fields set to overlap with transmission of the desired beacon.

Figures 9A, 9B:
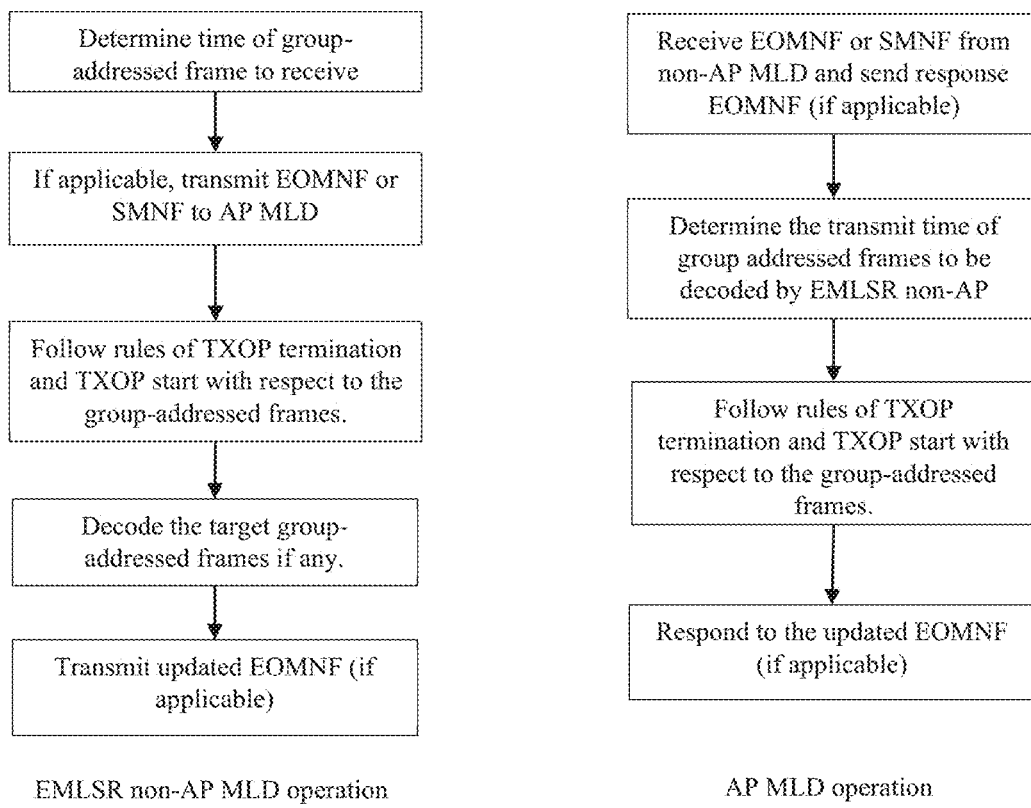
FIGS. 9A and 9B illustrate an example procedure enabling group-addressed frame reception by an EMLSR non-AP MLD operating in EMLSR mode according to embodiments of the present disclosure.

FIGS. 9A and 9B illustrate an example procedure enabling group-addressed frame reception by an EMLSR non-AP MLD operating in EMLSR mode according to embodiments of the present disclosure. FIG. 9A illustrates the perspective of the EMLSR non-AP MLD. FIG. 9B illustrates the perspective of the AP MLD that is associated with the EMLSR non-AP MLD.

FIGS. 10A and 10B illustrate an example procedure for negotiating a group link for group-addressed frame reception by an EMLSR non-AP MLD operating in EMLSR mode according to embodiments of the present disclosure. FIG. 10A illustrates the perspective of the EMLSR non-AP MLD. FIG. 10B illustrates the perspective of the AP MLD that is associated with the EMLSR non-AP MLD.

In one alternative embodiment, the aforementioned rules for ending frame exchanges can used for EMLSR devices as well as EMLMR devices and MLDs with NSTR link pairs, i.e., for all constrained non-AP MLDs.

When a non-AP MLD is operating in the EMLMR mode with an AP MLD supporting the EMLMR mode, the following may apply:

An AP affiliated with the AP MLD may end frame exchanges initiated with a STA affiliated with the non-AP MLD on one of the EMLMR links at least an EMLMR delay, indicated in the EMLMR Delay subfield, before another AP affiliated with the same AP MLD schedules transmission of group-addressed frames on another EMLMR link, if the STA affiliated with the non-AP MLD on the other EMLMR link is expected to receive those group-addressed frames, and the frame exchanges are expected to inhibit the reception of the group-addressed frames.

An AP affiliated with the AP MLD may not initiate a frame exchange with a STA affiliated with the non-AP MLD on one of the EMLMR links either during or within an EMLMR delay of the end of group-addressed frame transmissions by another AP affiliated with the same AP MLD on another EMLMR link, if the STA affiliated with the non-AP MLD on the other EMLMR link is expected to receive those group-addressed frames, and the frame exchanges are expected to inhibit the reception of the group-addressed frames.

If an AP affiliated with the AP MLD initiates frame exchanges with a STA that is affiliated with the non-AP MLD on one of the EMLMR links and the frame exchanges overlap in time with the reception of group-addressed frames on another EMLMR link, then the STA affiliated with the non-AP MLD may not respond to the initial frame that is transmitted by the AP affiliated with the AP MLD to initiate the frame exchanges, if the STA affiliated with the non-AP MLD on the other EMLMR link is expected to receive those group-addressed frames, and the frame exchanges are expected to inhibit the reception of the group-addressed frames.

When a STA of the non-AP MLD initiates a TXOP, the STA may end the TXOP at least an EMLMR delay before the TBTTs of any other EMLMR links if the non-AP MLD intends to receive the beacon frames that are scheduled to be transmitted in those TBTTs, and the frame exchanges in the TXOP are expected to inhibit the reception of the beacon frames.

In either of the EMLSR case, EMLMR case, or NSTR case, the expectation to receive group-addressed frames on a link by an EMLSR or EMLMR non-AP MLD can be inferred at the AP MLD from the primary link negotiation (if any). To nominate a primary link for group-addressed frame reception, a STA affiliated with a non-AP MLD may transmit, to an AP affiliated with the associated AP MLD, a frame containing an indication of the link ID of the primary link. In one embodiment, this frame indicating the primary link can be the EML Operating Mode Notification frame where the EML control field has an optional primary link sub-field.

FIG. 11 illustrates an example format of an EML control field of an EOMNF with an optional primary link subfield according to embodiments of the present disclosure. The Primary link present subfield of the EML control field is set to 1 to indicate the presence of the Primary link subfield in the EML control field, and is set to 0 otherwise. When the EML control field is transmitted by a non-AP MLD and the Primary link present subfield is set to 1, the Primary link subfield indicates the link ID of the primary link that the non-AP MLD intends to use for receiving group-addressed frames from the associated AP MLD. A value of i in the EMLSR Primary link subfield indicates that the STA of the non-AP MLD operating on link ID i is expected to be used for receiving group-addressed frames.

In this embodiment, to nominate a primary link, a STA affiliated with a non-AP MLD may transmit, to an AP affiliated with the associated AP MLD, an EML Operating Mode Notification frame with the primary link subfield of the EML Control field of the frame included and set to the link ID of the desired primary link. Upon receiving, by a STA affiliated with the non-AP MLD, a response EML Operating Mode Notification frame from the associated AP with an identical value in the primary link subfield of the EML control field, the primary link nomination (or termination) is deemed successful. If unsuccessful, an existing primary link, if any, can continue to be applicable.

To terminate an existing negotiation of a primary link for group-addressed frame reception, a STA affiliated with a non-AP MLD may transmit the same frame that was used to negotiate a primary link, but now without the link ID indication. For example, in one embodiment the STA may transmit an EML Operating Mode Notification frame with the primary link subfield absent in the EML Control field. In one embodiment, the primary link negotiation may not be initiated by a non-AP MLD which neither has NSTR link pairs, nor is either operating in or switching to the EMLSR mode of operation, nor is either operating in or switching to the EMLMR mode of operation.

In one embodiment, a failure of a primary link negotiation may not preclude the success of other notifications in the EML operating mode notification frame, such as a switch to the EMLSR or EMLMR mode of operation.

An AP affiliated with the AP MLD that receives from an associated non-AP MLD a frame indicating a request for a primary link with the corresponding link ID may transmit a response frame that either accepts or rejects the request, and may also recommend an alternative link ID for use as a primary link. Although examples of this process below are given for the case where the frame is the EML Operating mode notification frame, in general, any other frame can also be defined to carry the primary link indication using a similar operation.

An AP affiliated with the AP MLD that receives from an associated non-AP MLD an EML Operating Mode Notification frame with a primary link subfield included in the EML control field may transmit a response EML Operating Mode Notification frame with:

The Primary link subfield of the EML Control field set to the same value as that in the EML Operating mode notification frame received from the non-AP MLD to indicate a successful negotiation of the primary link.

The Primary link subfield of the EML Control field set to a different value from that in the EML Operating mode notification frame received from the non-AP MLD to indicate a failure of negotiation of the primary link, and to recommend an alternative link ID for the primary link.

The Primary link subfield absent in the EML Control field to indicate a failure of negotiation of the primary link.

An AP affiliated with the AP MLD that receives from an associated non-AP MLD an EML Operating Mode Notification frame with a primary link subfield absent in the EML control field may accept the request to terminate the existing primary link negotiation by transmitting a response EML Operating Mode Notification frame with the primary link subfield absent. An AP may reject a primary link negotiation from a non-AP MLD which neither has NSTR link pairs, nor is either operating in or switching to the EMLSR mode of operation, nor is either operating in or switching to the EMLMR mode of operation (i.e., a non-AP MLD that is not a constrained non-AP MLD).

In another embodiment, the primary link can be called the default group link, and the frame to indicate the default group link can be a new protected EHT Action frame called the Default Group Link Notification Frame.

Figures 12, 13, 14:
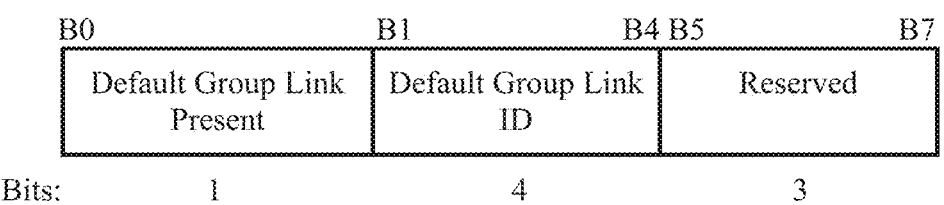
FIG. 12 illustrates an example format of a Default Group Link Notification Frame according to embodiments of the present disclosure.
FIG. 13 illustrates examples of the Protected EHT Action field value of the Default Group Link Notification Frame of FIG. 12 according to embodiments of the present disclosure.
FIG. 14 illustrates an example format of the Default Group Link field of the Default Group Link Notification Frame of FIG. 12 according to embodiments of the present disclosure.

FIG. 12 illustrates an example format of a Default Group Link Notification Frame according to embodiments of the present disclosure.

FIG. 13 illustrates examples of the Protected EHT Action field value of the Default Group Link Notification Frame of FIG. 12 according to embodiments of the present disclosure.

FIG. 14 illustrates an example format of the Default Group Link field of the Default Group Link Notification Frame of FIG. 12 according to embodiments of the present disclosure.

To notify an associated AP MLD of a default group link for group-addressed frame reception, a STA affiliated with a non-AP MLD can transmit, to an AP affiliated with the associated AP MLD, a Default Group Link Notification frame with the Default Group Link Present subfield of the Default Group Link field set to 1. To terminate an existing default group link for group-addressed frame reception, a STA affiliated with a non-AP MLD can transmit a Default Group Link Notification frame with the Default Group Link Present subfield of the Default Group Link field set to 0. When the Default Group Link Present subfield is set to 1, a value of i in the Default Group Link ID subfield indicates that the STA of the non-AP MLD operating on link ID i is expected to receive the group-addressed frames. When the Default Group Link Present subfield is set to 0, the Default Group Link ID subfield is reserved.

In one embodiment, the Default Group Link Notification frame may not be transmitted by an AP. In one embodiment, the Default Group Link Notification frame may not be transmitted by a non-AP MLD with all STR (simultaneous transmit and receive) links. In one embodiment, the Default Group Link Notification frame may not be transmitted by a non-AP MLD that has no NSTR link pairs, and that is not operating in EMLSR mode or EMLMR mode. In one embodiment, the Default Group Link Notification frame can also be transmitted by a multi-link single radio (MLSR) device.

A non-AP MLD that has negotiated a default group link for group-addressed frame reception may use the STA operating on the default group link for receiving the group-addressed frames, unless there is an exception requiring a STA on another link to receive group-addressed frames. For example, such exceptions may include a STA affiliated with the non-AP MLD receiving a TIM element indicating buffered group-addressed frames at an AP operating on another link, or receiving a BSS Parameter Change Count subfield for an AP operating on another link that is different from the previously received value.

Figures 15A, 15B:
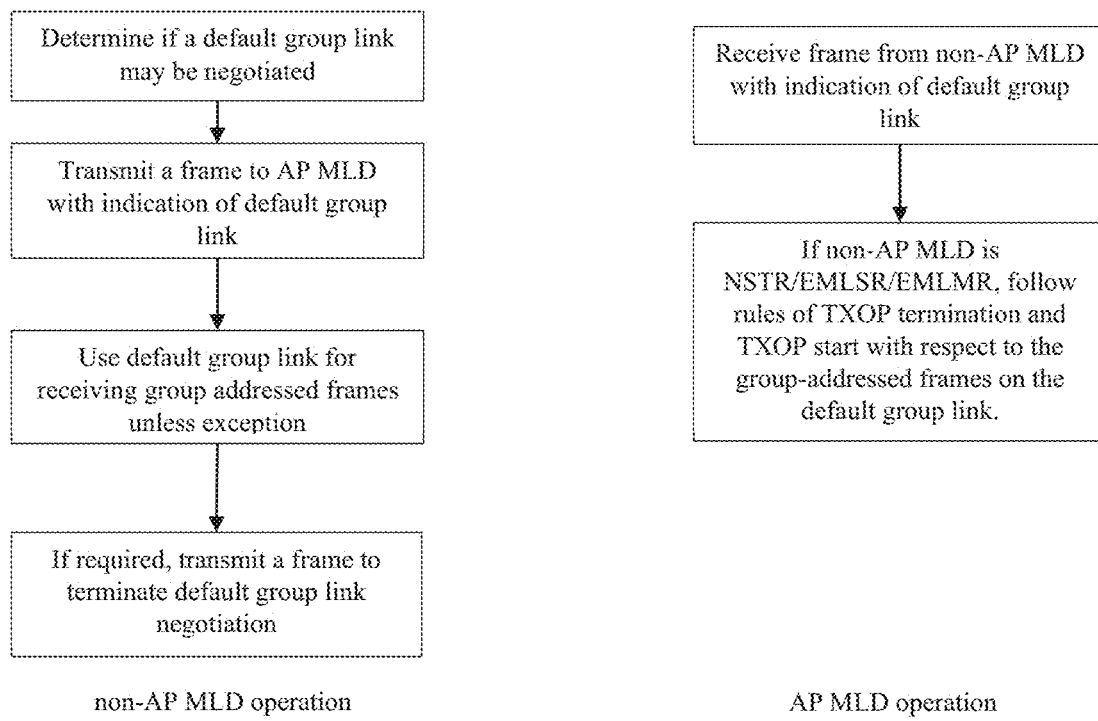
FIGS. 15A and 15B illustrate an example procedure for negotiating a default group link for group-addressed frame reception by a constrained non-AP MLD according to embodiments of the present disclosure.

FIGS. 15A and 15B illustrate an example procedure for negotiating a default group link for group-addressed frame reception by a constrained non-AP MLD according to embodiments of the present disclosure. FIG. 15A illustrates the perspective of the constrained non-AP MLD. FIG. 15B illustrates the perspective of the AP MLD that is associated with the constrained non-AP MLD.

Figure 16:
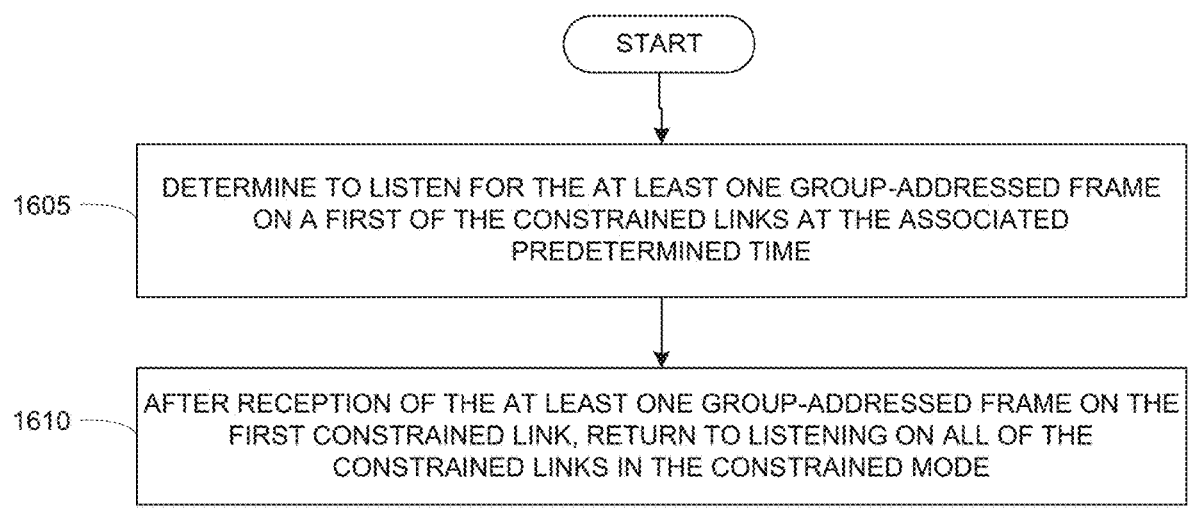
FIG. 16 illustrates an example process for facilitating the reception of group-addressed frames by MLDs operating under constraints on simultaneous transmission and reception across multiple links according to various embodiments of the present disclosure.

FIG. 16 illustrates an example process for facilitating the reception of group-addressed frames by MLDs operating under constraints on simultaneous transmission and reception across multiple links according to various embodiments of the present disclosure. The process of FIG. 16 is discussed as being performed by a non-AP MLD, but it is understood that a corresponding AP MLD performs a corresponding process. Additionally, for convenience the process of FIG. 16 is discussed as being performed by a WI-FI non-AP MLD comprising a plurality of STAs that each comprise a transceiver configured to configured to form a link with a corresponding AP affiliated with a WI-FI AP MLD, wherein at least a subset of the links are constrained links that are configured to operate in a constrained mode of operation (e.g., EMLSR, EMLMR, or NSTR modes), and each of the links has an associated predetermined time at which at least one group-addressed frame (e.g., a beacon frame) is expected to be transmitted by the AP MLD on the link. However, it is understood that any suitable wireless communication device could perform these processes.

Referring to FIG. 16, the process begins with the non-AP MLD determining, while the constrained links are operating in an active listening state in the constrained mode, to listen for the at least one group-addressed frame on a first of the constrained links at the associated predetermined time (step 1605). Due to the constrained mode operation, the non-AP MLD may not respond to any initial control frame that is transmitted by the AP MLD on any of the other constrained links if a frame exchange initiated by the initial control frame would overlap with the at least one group-addressed frame on the first constrained link.

Furthermore, if the non-AP MLD is participating in a frame exchange with the AP MLD on any of the constrained links, the frame exchange may be ended before the predetermined times associated with one of the constrained links. Either the non-AP MLD or the AP MLD may end such a frame exchange. In some embodiments, the frame exchange is only ended if the non-AP MLD is expected to listen for group-addressed frames on the corresponding constrained link at that predetermined time. The frame exchange may be ended at least a guard time before the predetermined time, for example, to give the non-AP MLD sufficient time to switch a radio to another link in EMLSR mode.

Next, after reception of the at least one group-addressed frame on the first constrained link, the non-AP MLD returns to listening on all of the constrained links in the constrained mode (step 1610). The non-AP MLD may transmit the request for AAR to the AP MLD over the first EMLSR link as a frame of the EMLSR frame exchange sequence.

In some embodiments, before determining to listen for group-addressed frames on the first constrained link at step 1605, the non-AP MLD determines the first constrained link to be a group link on which the non-AP MLD will listen for all group-addressed frames while operating in the constrained mode. The non-AP MLD may or may not indicate the group link to the AP MLD. If the non-AP MLD determines that it will indicate the group link to the AP MLD, the non-AP MLD may transmit, to the AP MLD, a message indicating that the first constrained link is the group link, before the determination to listen for the at least one group-addressed frame. The message may be an EOMNF or another action frame that includes a link identifier of the first constrained link. In other embodiments, the identity of the group link may be indicated implicitly, for example by the use of the group link to transmit the EOMNF when transitioning into EMLSR mode.

In some embodiments, the non-AP MLD may determine to nominate the first constrained link as the group link, and may generate a frame that includes a link identifier of the first constrained link and transmit the frame to the AP MLD to indicate the nomination. The non-AP MLD may receive, from the AP MLD, a response frame that includes an indication to use the first constrained link as the group link, or that includes an indication that the group link is rejected. In the latter case, operation may continue as if no group link is selected, or as if all constrained links are group links. In some embodiments, the non-AP MLD may terminate the use of a previously established group link.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point multi-link device (non-AP MLD), comprising:
   stations (STAs), each comprising a transceiver configured to form a link with a corresponding access point (AP) of an access point multi-link device (AP MLD), wherein:
      each of the links has an associated predetermined time at which at least one group-addressed frame is expected to be received on the link, and
      at least a subset of the links are constrained links that are configured to operate in a constrained mode of operation; and
   a processor operably coupled to the STAs, the processor configured to:
      while the constrained links are operating in an active listening state in the constrained mode, determine to listen for the at least one group-addressed frame on a first of the constrained links at the associated predetermined time, and
      after reception of the at least one group-addressed frame on the first constrained link, return to listening on all of the constrained links in the constrained mode by transmitting a request for application-aware routing (AAR) to the AP MLD over the first constrained link.

2. The non-AP MLD of claim 1, wherein the processor is further configured not to respond to any individually addressed frame that is transmitted by the AP MLD on any of the other constrained links based on a determination that a frame exchange initiated by the individually addressed frame would overlap with the at least one group-addressed frame on the first constrained link, and based on the determination to listen for the at least one group-addressed frame on the first constrained link.

3. The non-AP MLD of claim 1, wherein:
   at least one of the transceivers is further configured to participate in a frame exchange with the AP MLD on one of the constrained links, and
   the frame exchange is ended at least a guard time before each of the predetermined times associated with one of the constrained links.

4. The non-AP MLD of claim 1,
   wherein the processor is further configured to determine the first constrained link to be a group link on which the non-AP MLD will listen for all group-addressed frames while operating in the constrained mode,
   wherein at least one of the transceivers is further configured to:
      determine whether to indicate to the AP MLD that the first constrained link is the group link;
      transmit, to the AP MLD, based on a determination to indicate to the AP MLD that the first constrained link is the group link, a message indicating that the first constrained link is the group link, before the determination to listen for the at least one group-addressed frame; and
      participate in a frame exchange with the AP MLD on one of the constrained links, and
   wherein the frame exchange is ended by the AP MLD at least a guard time before the predetermined time associated with the first constrained link.

5. The non-AP MLD of claim 4, wherein the processor is further configured to generate the message as an enhanced multi-link operating mode notification frame (EOMNF) that includes a link identifier of the group link.

6. The non-AP MLD of claim 4, wherein the processor is further configured to generate the message as an action frame that includes a link identifier of the group link.

7. The non-AP MLD of claim 1,
   wherein the processor is further configured to:
      determine to nominate the first constrained link as a group link on which the non-AP MLD will listen for all group-addressed frames while operating in the constrained mode; and
      generate a frame that includes a link identifier of the first constrained link,
   wherein at least one of the transceivers is further configured to:
      transmit, to the AP MLD, the generated frame, before the determination to listen for the at least one group-addressed frame;
      receive, from the AP MLD, a response frame that includes an indication to use the first constrained link as the group link; and
      participate in a frame exchange with the AP MLD on one of the constrained links, and
   wherein the frame exchange is ended at least a guard time before the predetermined time associated with the first constrained link.

8. An access point multi-link device (AP MLD), comprising:
   access points (Aps), each comprising a transceiver configured to form a link with a corresponding station (STA) of a non-access point multi-link device (non-AP MLD), wherein:
      each of the links has an associated predetermined time at which at least one group-addressed frame is expected to be transmitted on the link, and
      at least a subset of the links are constrained links that are configured to operate in a constrained mode of operation; and
   a processor operably coupled to the STAs, the processor configured to:
      determine to initiate a frame exchange on one of the constrained links,
      determine whether the frame exchange would overlap with the at least one group-addressed frame on any of the constrained links,
      based on a determination that the frame exchange would overlap with the at least one group-addressed frame on any of the constrained links, determine that no response to any initial control frame transmitted to the non-AP MLD on any of the constrained links to initiate the frame exchange is expected, and
      determine whether the non-AP MLD intends to listen for the at least one group-addressed frame on a first of the constrained links at the associated predetermined time by receiving, from the non-AP MLD, a request for application-aware routing (AAR) on the first constrained link.

9. The AP MLD of claim 8, wherein the processor is further configured to:
   based on the determination that the non-AP MLD intends to listen for the at least one group-addressed frame on a first of the constrained links at the associated predetermined time, determine whether the frame exchange would overlap with the at least one group-addressed frame on the first constrained link, and
   based on the determination that the frame exchange would overlap with the at least one group-addressed frame on the first constrained link, determine not to transmit any initial control frame to the non-AP MLD on any of the constrained links to initiate the frame exchange.

10. The AP MLD of claim 8, wherein the processor is further configured to:
based on a determination that the non-AP MLD intends to listen for the at least one group-addressed frame on a first of the constrained links at the associated predetermined time, determine whether the frame exchange would overlap with the at least one group-addressed frame on the first constrained link or would overlap with a guard time before or after the at least one group-addressed frame on the first constrained link, and
based on the determination that the frame exchange would overlap with the at least one group-addressed frame or would overlap with a guard time before or after the at least one group-addressed frame on the first constrained link, determine not to transmit any initial control frame to the non-AP MLD on any of the constrained links to initiate the frame exchange.

11. The AP MLD of claim 8, wherein:
at least one of the transceivers is further configured to receive, from the non-AP MLD, a message indicating that a first of the constrained links is a group link on which the non-AP MLD will listen for all group-addressed frames while operating in the constrained mode, and
the processor is further configured to:
determine whether the frame exchange would overlap with the at least one group-addressed frame on the first constrained link or would overlap with a guard time before or after the at least one group-addressed frame on the first constrained link, and
based on the determination that the frame exchange would overlap with the at least one group-addressed frame or would overlap with a guard time before or after the at least one group-addressed frame on the first constrained link, determine not to transmit any initial control frame to the non-AP MLD on any of the constrained links to initiate the frame exchange.

12. The AP MLD of claim 11, wherein the message is an enhanced multi-link operating mode notification frame (EOMNF) that includes a link identifier of the group link.

13. The AP MLD of claim 11, wherein the message is an action frame that includes a link identifier of the group link.

14. The AP MLD of claim 8,
wherein at least one of the transceivers is further configured to receive, from the non-AP MLD, a frame that includes a link identifier of the first constrained link,
wherein the processor is further configured to:
determine, from the frame, that the first constrained link is a group link on which the non-AP MLD will listen for all group-addressed frames while operating in the constrained mode; and
generate a response frame that includes an indication to use the first constrained link as the group link,
wherein at least one of the transceivers is further configured to transmit, to the non-AP MLD, the response frame, and
wherein the processor is further configured to:
based on a determination that the non-AP MLD intends to listen for the at least one group-addressed frame on a first of the constrained links at the associated predetermined time, determine whether the frame exchange would overlap with the at least one group-addressed frame on the first constrained link; and
based on the determination that the frame exchange would overlap with the at least one group-addressed frame on the first constrained link, determine not to transmit any initial control frame to the non-AP MLD on any of the constrained links to initiate the frame exchange.

15. A method of wireless communication performed by a non-access point multi-link device (non-AP MLD) that comprises stations (STAs) that each comprise a transceiver configured to form a link with a corresponding access point (AP) of an access point multi-link device (AP MLD), each of the links having an associated predetermined time at which at least one group-addressed frame is expected to be received on the link, and at least a subset of the links being constrained links that are configured to operate in a constrained mode of operation, the method comprising:
while the constrained links are operating in an active listening state in the constrained mode, determining to listen for the at least one group-addressed frame on a first of the constrained links at the associated predetermined time; and
after reception of the at least one group-addressed frame on the first constrained link, returning to listening on all of the constrained links in the constrained mode by transmitting a request for application-aware routing (AAR) to the AP MLD over the first constrained link.

16. The method of claim 15, further comprising not responding to any individually addressed frame that is transmitted by the AP MLD on any of the other constrained links based on a determination that a frame exchange initiated by the individually addressed frame would overlap with the at least one group-addressed frame on the first constrained link, and based on the determination to listen for the at least one group-addressed frame on the first constrained link.

17. The method of claim 15, further comprising:
participating in a frame exchange with the AP MLD on one of the constrained links,
wherein the frame exchange is ended at least a guard time before each of the predetermined times associated with one of the constrained links.

18. The method of claim 15, further comprising:
determining the first constrained link to be a group link on which the non-AP MLD will listen for all group-addressed frames while operating in the constrained mode;
transmitting, to the AP MLD, a message indicating that the first constrained link is the group link, before the determination to listen for the at least one group-addressed frame; and
participating in a frame exchange with the AP MLD on one of the constrained links,
wherein the frame exchange is ended by the AP MLD at least a guard time before the predetermined time associated with the first constrained link.

19. The method of claim 18, further comprising generating the message as an action frame that includes a link identifier of the group link.

20. The method of claim 15, further comprising:
determining to nominate the first constrained link as a group link on which the non-AP MLD will listen for all group-addressed frames while operating in the constrained mode;
generating a frame that includes a link identifier of the first constrained link;

transmitting, to the AP MLD, the generated frame, before the determination to listen for the at least one group-addressed frame;
receiving, from the AP MLD, a response frame that includes an indication to use the first constrained link as the group link; and
participating in a frame exchange with the AP MLD on one of the constrained links,
wherein the frame exchange is ended at least a guard time before the predetermined time associated with the first constrained link.

\* \* \* \* \*